(12) United States Patent
Sugimoto

(10) Patent No.: US 8,957,862 B2
(45) Date of Patent: Feb. 17, 2015

(54) OPERATION INPUT SYSTEM AND OPERATION INPUT METHOD

(71) Applicant: Yasuaki Sugimoto, Hachioji (JP)

(72) Inventor: Yasuaki Sugimoto, Hachioji (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 88 days.

(21) Appl. No.: 13/674,295

(22) Filed: Nov. 12, 2012

(65) Prior Publication Data

US 2013/0127725 A1    May 23, 2013

(30) Foreign Application Priority Data

Nov. 18, 2011    (JP) ................. 2011-252820

(51) Int. Cl.
G06F 3/02       (2006.01)
G06F 21/31      (2013.01)
G06F 3/0488     (2013.01)

(52) U.S. Cl.
CPC G06F 3/02 (2013.01); G06F 21/31 (2013.01); G06F 3/04886 (2013.01)
USPC .................................. 345/168; 345/8; 345/9

(58) Field of Classification Search
None
See application file for complete search history.

(56) References Cited

U.S. PATENT DOCUMENTS

2012/0268393 A1*  10/2012  Lee ............................ 345/173
2013/0016070 A1*  1/2013   Starner et al. ............. 345/175
2013/0027572 A1*  1/2013   Petrou ....................... 348/220.1

FOREIGN PATENT DOCUMENTS

| JP | 2004-126973 A | 4/2004 |
|----|---------------|--------|
| JP | 2005-258838 A | 9/2005 |
| JP | 2007-272718 A | 10/2007 |
| JP | 2007-328445 A | 12/2007 |
| JP | 2011-090636 A | 5/2011 |
| JP | 2011-113523 A | 6/2011 |

OTHER PUBLICATIONS

Office Action (Notice of Reason for Refusal) issued Oct. 16, 2013, by the Japanese Patent Office in corresponding Japanese Patent Application No. 2011-252820, and an English Translation of the Office Action. (8 pages).

* cited by examiner

*Primary Examiner* — Adam R Giesy

(74) *Attorney, Agent, or Firm* — Buchanan Ingersoll & Rooney PC

(57) ABSTRACT

Disclosed is an operation input system including: an operation display device; and a display device, wherein in case that the operation display device receives input of security information, the operation display device sets input keys in the key arrangement on a screen of the display unit and displays the operation window in which the input keys or at least contents of the input keys cannot be visually recognized, and the operation detecting unit receives the operation for the set input keys, and the display device controls display contents of the second display unit so as to display a state in which a virtual image of the input keys is combined with a situation in which an operator operates the display unit in accordance with an image shot by the camera so as to match a position of the virtual image with the set input keys.

20 Claims, 17 Drawing Sheets

FIG.15A
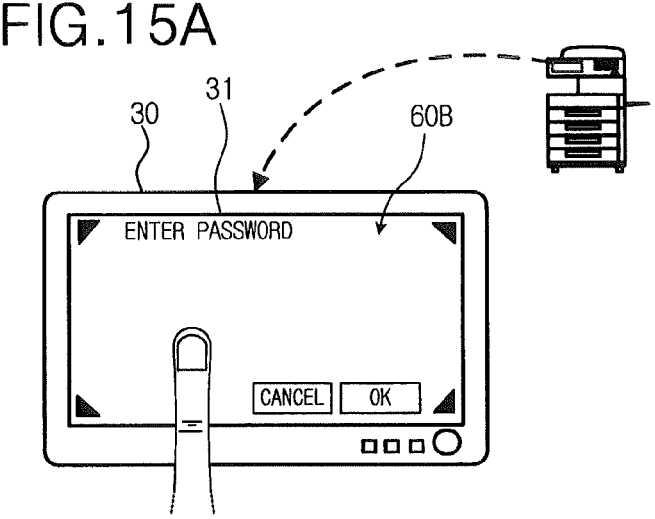
FIG.15B ⇩   FIG.15C
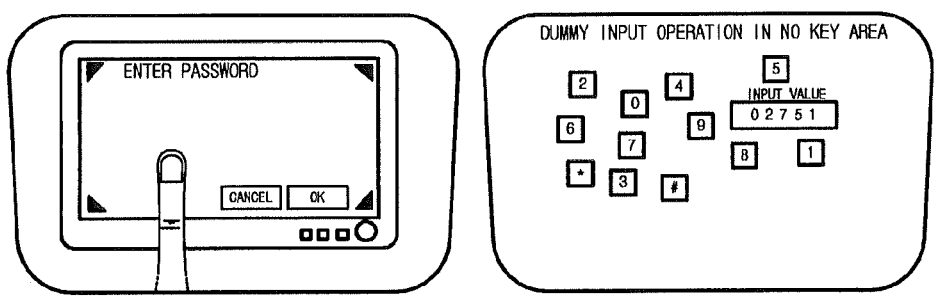
FIG.15D
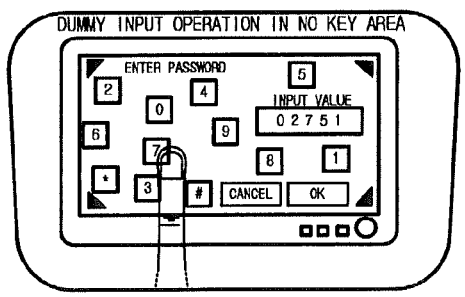

US 8,957,862 B2

OPERATION INPUT SYSTEM AND OPERATION INPUT METHOD

BACKGROUND OF THE INVENTION

1. Field of the Invention

The present invention relates to an operation input system and an operation input method for receiving an input operation from a user via an operation window, in particular, an operation input system and an operation input method for receiving the input of security information, such as a password or the like.

2. Description of Related Art

In case that the security information, such as a password, is input via an operation panel, when another person is near the operation panel, another person secretly looks at the operation panel or the motion of the user's hand during the input of the security information. Therefore, there is some possibility that the contents of the input security information are leaked.

In order to prevent the leak of the information from being caused by secretly looking at the operation panel or the like, for example, the method in which even though another person secretly looks at the motion of the user's hand or the like, the input contents cannot be easily guessed by changing the arrangement in the software numerical keypad displayed on the operation panel, is proposed (See Japanese Patent Application Publication No. 2005-258838).

Even though the arrangement in the software numerical keypad is changed every time, as shown in FIG. 16, when another person secretly looks at the operation window of the operation panel from behind the user, it is not possible to prevent the leak of the input contents. Similarly, as shown in FIG. 17, when another user secretly monitors the operation window by using the video camera which is intentionally installed, it is not possible to prevent the leak of the input contents.

SUMMARY

To achieve at least one of the abovementioned objects, an operation input system reflecting one aspect of the present invention comprises:

an operation display device comprising a display unit to display an operation window, and an operation detecting unit to detect an operation for the operation window; and a display device comprising a camera and a second display unit, the display device being communicable with the operation display device, wherein in case that the operation display device receives input of security information, the operation display device sets input keys in a predetermined key arrangement on a screen of the display unit and displays the operation window in which the input keys or at least contents of the input keys cannot be visually recognized, on the display unit, and the operation detecting unit receives the operation for the set input keys, and the display device controls display contents of the second display unit so as to display a state in which a virtual image of the input keys is combined with a situation in which an operator operates the display unit in accordance with an image shot by the camera so as to match a position of the virtual image with the set input keys.

Preferably, in case that the operation display device receives the input of the security information, the second display unit displays an instruction for carrying out a dummy input operation except the operation which is necessary for inputting the security information.

Preferably, in case that the operation display device receives the input of the security information, the operation display device displays the operation window in which the input keys are hidden on the display unit, and instructs the operator to carry out the dummy input operation for an area in which the input keys are not arranged.

Preferably, in case that the operation display device receives the input of the security information, the operation display device displays the operation window in which each frame of the input keys is displayed and the contents of the input keys are hidden on the display unit, and instructs the operator to carry out the dummy input operation the predetermined number of times at a beginning or an end of the operation which is necessary for inputting the security information or in a middle of the operation which is necessary for inputting the security information.

Preferably, in case that the operation display device receives the input of the security information, the operation display device transmits information relating to the predetermined key arrangement to the display device, and the display device combines the virtual image of the input keys in accordance with the information relating to the predetermined key arrangement, which is received from the operation display device.

Preferably, in case that the operation display device receives the input of the security information, when the operation display device cannot communicate with the display device, the operation display device displays the input keys on the display unit.

Preferably, every time the operation display device receives the input of the security information, the operation display device changes the key arrangement.

Preferably, the display device displays an image obtained by combining the virtual image of the input keys with the image shot by the camera on the second display unit.

Preferably, the second display unit of the display device is a head-mounted display in which an image is overlapped with an outside scene by a half mirror, and the head-mounted display overlaps the virtual image of the input keys with the outside scene.

BRIEF DESCRIPTION OF THE DRAWINGS

The present invention will become more fully understood from the detailed description given hereinafter and the accompanying drawings given by way of illustration only, and thus are not intended as a definition of the limits of the present invention, and wherein:

FIGS. 15A to 15D are explanatory views showing the display examples which are displayed when the security information is input via the operation panel of the multi-function peripheral by using the head-mounted display according to the third embodiment;

DETAILED DESCRIPTION OF PREFERRED EMBODIMENTS

Hereinafter, preferred embodiments of the present invention will be explained with reference to the accompanying drawings.

Figure 1:
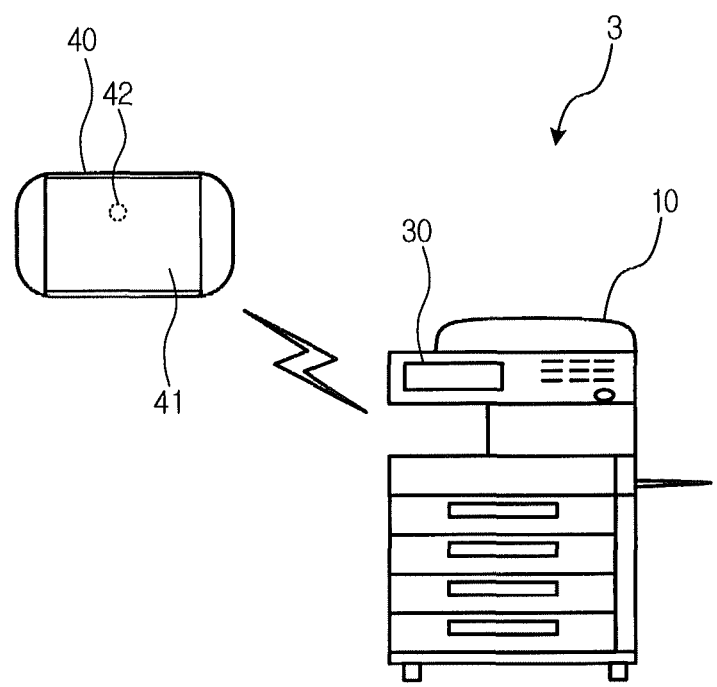
FIG. 1 is a view showing the system configuration of the operation input system according to the first embodiment.

FIG. 1 shows the configuration of the multi-function peripheral system 3 to which the operation input system according to the first embodiment is applied. The multi-function peripheral system 3 comprises an operation panel 30 (operation display device) which is provided in the multi-function peripheral 10 and a portable terminal 40 (display device) which is separated from the multi-function peripheral 10 and which a user can carry.

The multi-function peripheral 10 is a device having the functions to execute various types of jobs, such as a copy job for reading an original optically to print out an image obtained by reading the original, on recording paper, a scan job for storing image data as a file obtained by reading an original or for transmitting the image data to an external terminal via a network, a print job for forming an image relating to the image data received from a terminal device via the network, on the recording paper to print out the image, and the like.

The multi-function peripheral 10 comprises the operation panel 30 for receiving a job input operation, various type of setting operations and the like from a user. Further, the portable terminal 40 is also used when the security information, such as a password, is input via the operation panel 30. The portable terminal 40 comprises a display unit 41 provided on the front surface of the portable terminal 40 and a camera 42 provided on the rear surface of the portable terminal 40. The camera 42 carries out the shooting from the rear surface of the portable terminal 40.

Figure 2:
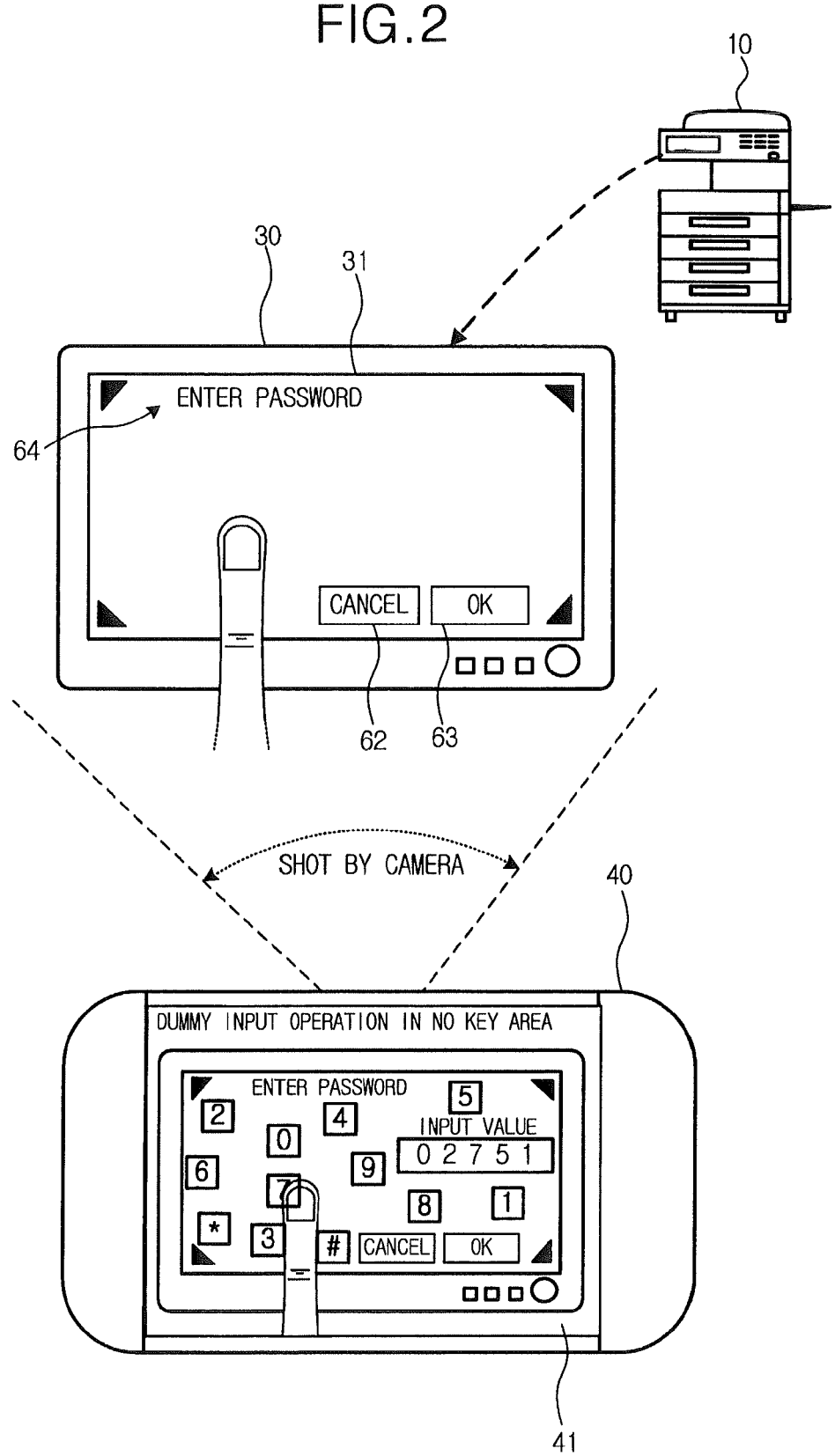
FIG. 2 is an explanatory view showing an example of the display contents in the operation panel and the portable terminal when the input operation for the security information is received.

When the input of the security information, such as a password, is received, the operation panel 30 of the multi-function peripheral 10 and the portable terminal 40 operate so as to cooperate with each other as shown in FIG. 2. That is, when the input of the security information, such as a password, is received, in the operation panel 30 of the multi-function peripheral 10, the input keys (software keypad) used for inputting the security information are hidden (or the frames (shapes) of the input keys are displayed but the contents thereof are hidden).

On the other hand, when the camera 42 of the portable terminal 40 carries out the shooting of the operation panel 30 of the multi-function peripheral 10, the display unit 41 of the portable terminal 40 displays the image obtained by combining the virtual image of the input keys which are hidden on the actual operation panel 30, with the operation panel displayed in the camera image so as to match the position of the virtual image. In this situation, when the operator operates the actual operation panel 30, the finger of the operator is shot by the camera 42. Therefore, as shown in the lower area of FIG. 2, in the portable terminal 40, the image obtained by combining the virtual image of the input keys with the situation in which the operator operates the operation panel 30 with his/her finger is displayed so as to match the position of the virtual image.

Because the operator can carry out the input operation by looking at the display unit 41 of the portable terminal 40, the operator can recognize the position of each input key and can smoothly carry out the input operation for the operation panel 30 in which the input keys are hidden. For example, in case that the operator carries out the input operation for inputting the security information via the operation panel 30 so as to prevent another person from secretly looking at the display unit 41, such as by bringing the operator's face close to the portable terminal 40, even though another person secretly looks at the operation panel 30 or the motion of the finger during the input operation or even though the operation panel 30 or the motion of the finger is monitored by using a video camera, it is possible to prevent the leak of the input contents.

Figure 3:
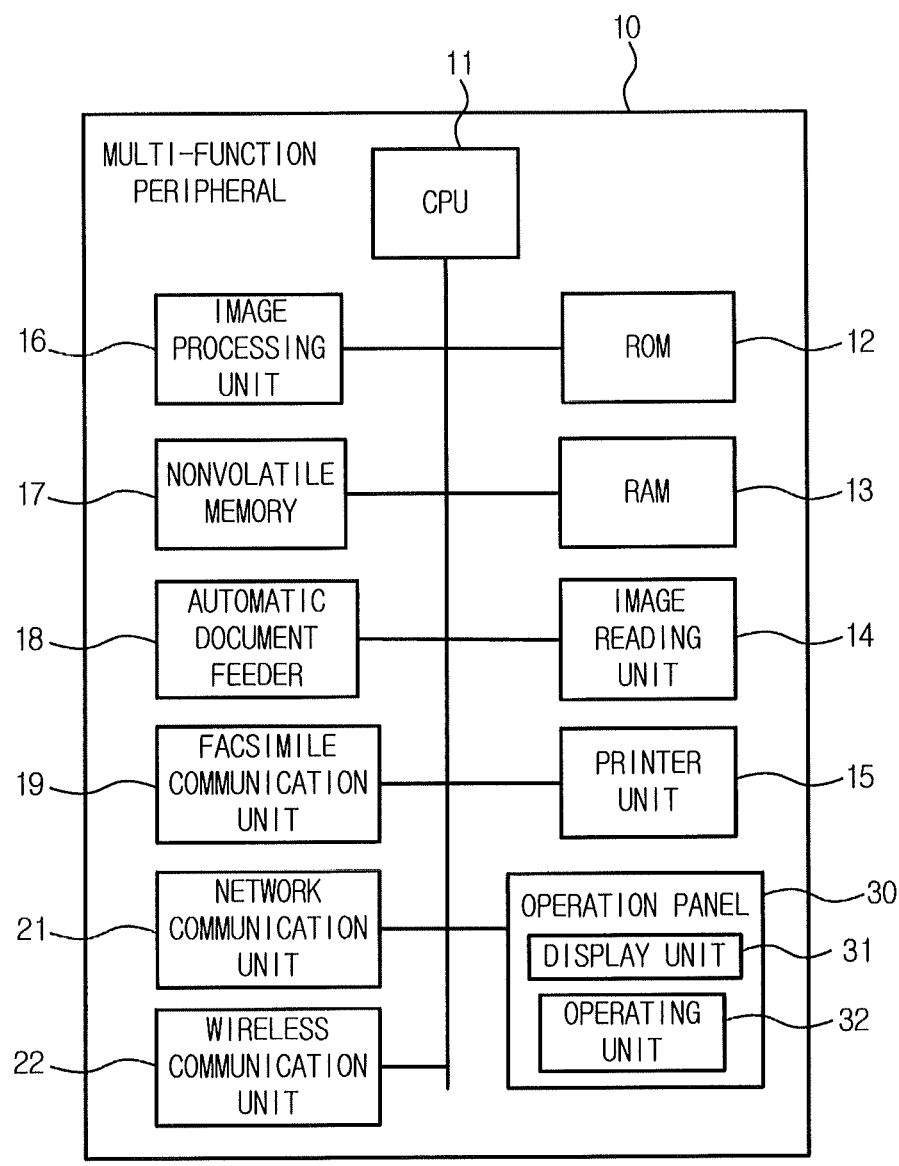
FIG. 3 is a block diagram showing the schematic configuration of the multi-function peripheral having the operation panel of the operation input system according to the first embodiment.

FIG. 3 is a block diagram showing the schematic configuration of the multi-function peripheral 10. The multi-function peripheral 10 comprises a CPU (Central Processing Unit) 11 for controlling the whole operation of the multi-function peripheral 10. The CPU 11 is connected to a ROM (Read Only Memory) 12, a RAM (Random Access Memory) 13, an image reading unit 14, a printer unit 15, an image processing unit 16, a nonvolatile memory 17, an automatic document feeder 18, a facsimile communication unit 19, a network communication unit 21, a wireless communication unit 22, the operation panel 30 and the like via a bus.

By the CPU 11, a middleware, application programs and the like are executed on an OS (Operating System) program as a base. Further, the CPU 11 has a function as the control unit for controlling the display contents of the operation panel 30 and the cooperative operation with the portable terminal 40.

In the ROM 12, various types of programs are stored. By executing the processes by the CPU 11 in accordance with these programs, the functions of the multi-function peripheral 10 are realized.

The RAM 13 is used as a work memory for temporarily storing various data when the CPU 11 executes the process in accordance with the programs and as an image memory for storing image data.

The image reading unit 14 has a function to read an original optically to obtain the image data. For example, the image reading unit 14 comprises a light source for irradiating the original with light, a line image sensor for reading the original line by line in the width direction of the original by receiving the reflected light from the original, a moving unit for sequentially moving the reading position line by line in the longitudinal direction of the original, an optical system having lenses, mirrors and the like for guiding the reflected light from the original to the line image sensor and focusing the reflected light on the line image sensor, a converting unit for converting an analog image signal outputted from the line image sensor into digital image data, and the like.

The printer unit 15 has a function to form an image based on image data, on recording paper. In this embodiment, the printer unit 15 is configured as the so-called laser printer for forming an image by the electrophotographic process. The laser printer comprises a conveying device for the recording paper, a photoconductive drum, a charging device, a laser unit, a developing device, a transfer and separation device, a cleaning device and a fixing device. The image may be formed by another system.

The image processing unit 16 carries out the rasterization processing for converting print data into image data, compression/decompression processing of image data and the like, in addition to the processings, such as enlargement/reduction and rotation of the image.

The nonvolatile memory 17 is a memory (flash memory) in which the stored contents are not damaged even if the multi-function peripheral 10 is turned off, and is used for storing various setting information and the like.

The automatic document feeder 18 has a function to convey the original set to the original feed tray from the top page sheet by sheet and pass the original through the reading position of the image reading unit 14. Further, the automatic document feeder 18 has a function to discharge the original to the predetermined discharge position.

The facsimile communication unit 19 has a function to transmit and receive image data via a public line to/from an external device having the facsimile communication function.

The network communication unit 21 has a function to transmit and receive the data to/from a terminal device or another external device via a network, such as a LAN (Local Area Network).

The wireless communication unit 22 has a function to carry out the wireless communication with the nearby portable terminal 40. It is only necessary to set the communicable distance between the wireless communication unit 22 and the portable terminal 40 to about 1 meter. Various technologies compliant with the Near Field Communication can be used. The wireless LAN (Local Area Network) may be used for the communication with the portable terminal 40.

The operation panel 30 comprises a display unit 31 and an operating unit 32. The display unit 31 is configured by a liquid crystal display (LCD) or the like, and has a function to display various type of operation windows, setting windows and the like. The operating unit 32 comprises various types of operation switches, such as a start button, and a touch panel provided on the physical screen of the display unit 31. The touch panel detects the coordinate position on which a user contacts with the screen of the display unit 31 by using a touch pen, the user's finger or the like.

Figure 4:
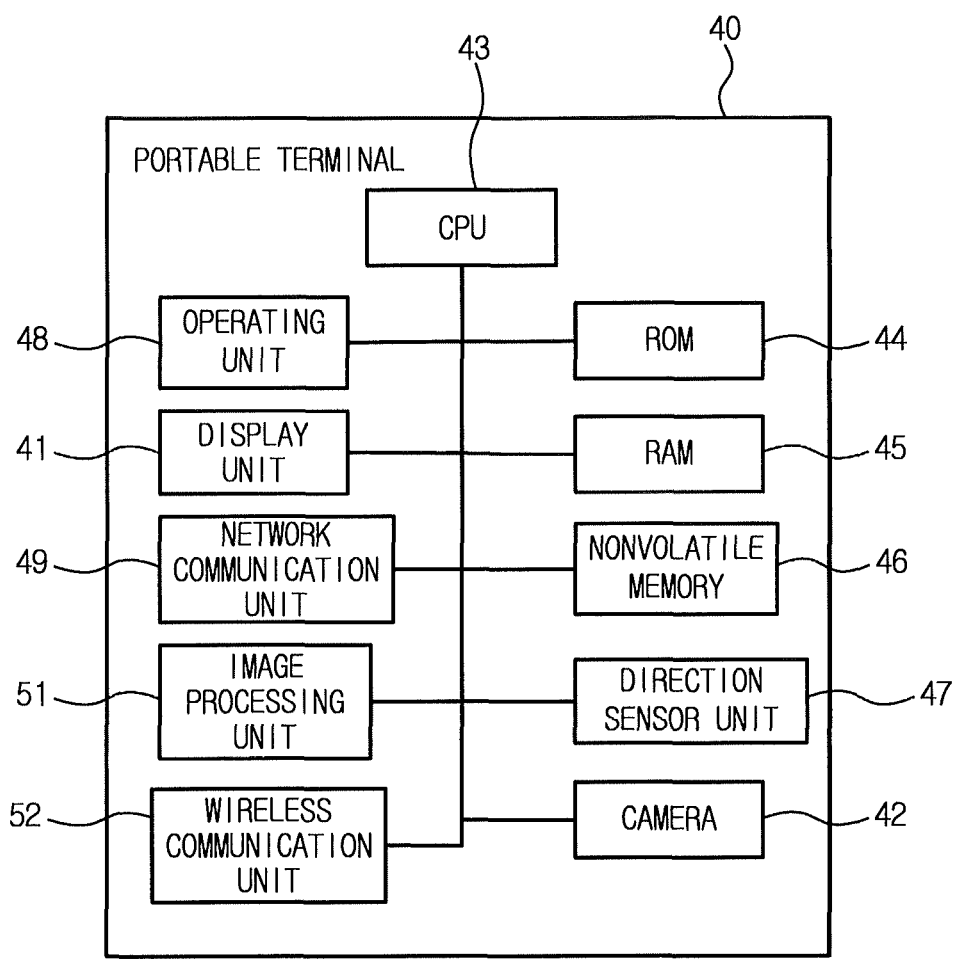
FIG. 4 is a block diagram showing the schematic configuration of the portable terminal of the operation input system according to the first embodiment.

FIG. 4 shows the schematic configuration of the portable terminal 40. The portable terminal 40 comprises a CPU 43, a ROM 44, a RAM 45, a nonvolatile memory 46, a direction sensor unit 47, a camera 42, an operating unit 48, a display unit 41, a network communication unit 49, an image processing unit 51, a wireless communication unit 52 and the like, which are connected to the CPU 43 via a bus.

The CPU 43 controls the operation of the portable terminal 40 in accordance with the programs stored in the ROM 44. In the ROM 44, the programs, the fixed data and the like are stored. The RAM 45 is used as a work memory for temporarily storing various data when the CPU 43 executes the process in accordance with the programs. In the nonvolatile memory 46, various types of setting information are stored.

The direction sensor unit 47 detects the direction and the attitude of the portable terminal 40 and the change in the direction and the attitude. The camera 42 is provided on the rear surface of the portable terminal 40 and carries out the shooting from the rear surface of the portable terminal 40. The camera 42 can take the movie, for example, the camera 42 takes the images at 30 frames per second.

The display unit 41 is configured by a liquid crystal display or the like. The operating unit 48 is configured by a touch panel provided on the physical screen of the display unit 41.

The network communication unit 49 has a function to communicate with the multi-function peripheral 10 or another external device via a network, such as LAN. The image processing unit 51 carries out various types of processings for the image data, such as rotation and enlargement/reduction. The wireless communication unit 52 has a function to carry out the wireless communication with the nearby multi-function peripheral 10. The wireless LAN may be used for the communication with the multi-function peripheral 10.

Figure 5:
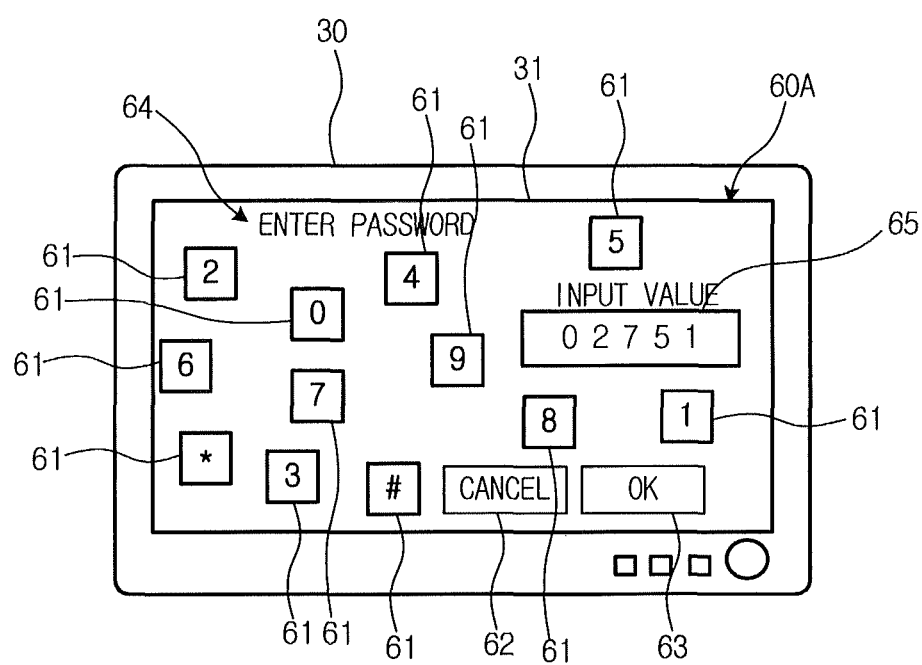
FIG. 5 is a plan view showing an example of the normal operation window which is displayed during the input of the security information according to the first embodiment.
Figure 6:
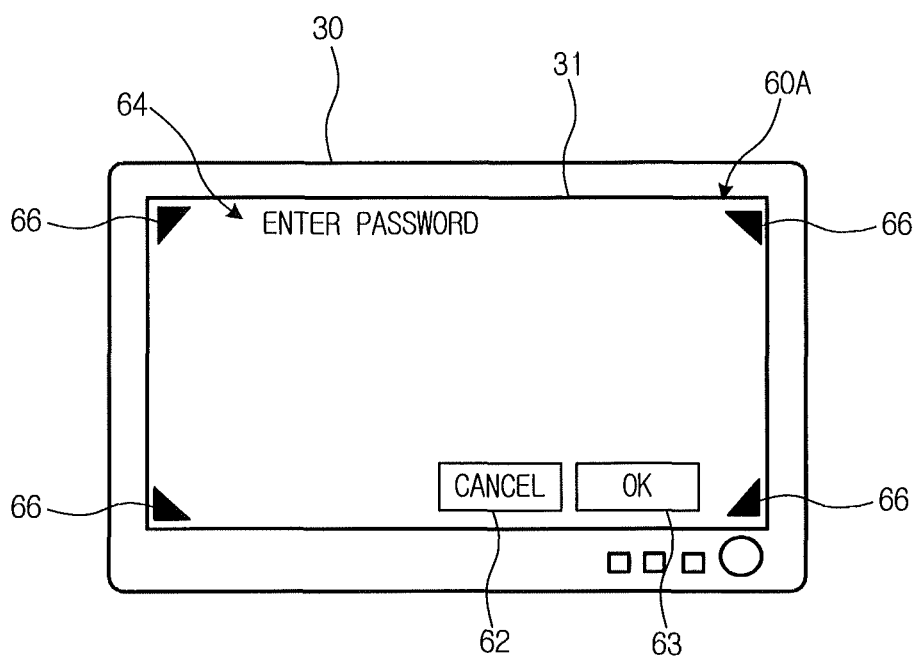
FIG. 6 is a plan view showing an example of the secret operation window (in which the input keys are hidden) which is displayed during the input of the security information according to the first embodiment.

FIG. 5 shows an example of the normal operation window 60A which is displayed during the input of the security information. FIG. 6 shows an example of the secret operation window 60B which is displayed during the input of the security information. The normal operation window 60A is displayed on the display unit 31 of the operation panel 30 when the security information is input via the operation panel 30 without using the portable terminal 40. In the normal operation window 60A, the objects, such as a plurality of input keys 61 used for inputting each character of the security information, a cancel button 62, an authorization button 63, a guide message 64, an input value display space 65 and the like, are displayed.

The secret operation window 60B is displayed on the display unit 31 of the operation panel 30 when the security information is input by using the portable terminal 40. In the secret operation window 60B, the input keys 61 and the input value display space 65 which are displayed in the normal operation window 60A, are hidden. Each of the input keys 61 is set (defined) on the window like the normal operation window 60A, but is hidden. At the four corners of the secret operation window 60B, position adjustment marks 66 are displayed. The position adjustment marks 66 indicate the reference position for specifying the position of the display unit 31 of the operation panel 30 in the image shot by the camera 42 of the portable terminal 40. In this embodiment, the position adjustment marks 66 are provided at the four corners of the secret operation window 60B, however, two position adjustment marks may be provided at the diagonal positions among the four corners. The shape and the arrangement of the position adjustment marks 66 are not limited to this embodiment as long as the position adjustment marks have the function to indicate the reference position.

Figure 7:
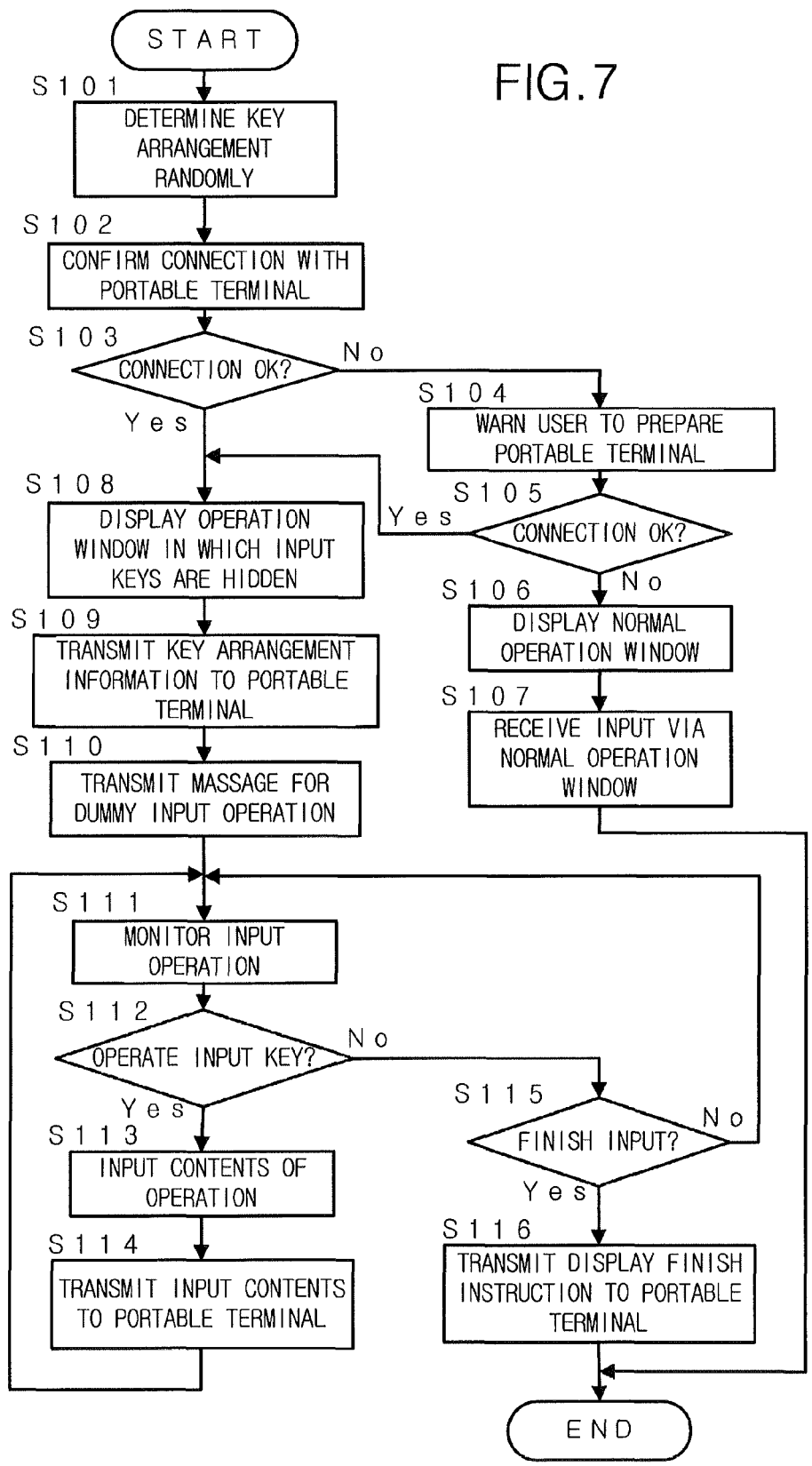
FIG. 7 is a flowchart showing the operation of the multi-function peripheral, which is carried out when the security information is input via the operation panel of the multi-function peripheral by using the portable terminal.

FIG. 7 shows the flowchart indicating the operation of the multi-function peripheral 10, which is carried out when the security information, such as a password, is input via the operation panel 30. For example, the multi-function peripheral 10 requires the user authorization when the multi-function peripheral 10 is used. When the input operation of ID (Identification) and a password for the user authorization is received, the operation shown in FIG. 7 is carried out.

The CPU 11 for controlling the operation panel 30 determines and sets (defines) the key arrangement of each input key 61 for inputting the security information, for example by the random sampling or the like, when the input of the security information is received (Step S101).

In this embodiment, the arrangement of the objects except the input keys 61 used for inputting the security information in the operation window for inputting the security information, are previously fixed. On the other hand, each of the input keys 61 for inputting the security information is arranged at random in the space in which the objects arranged fixedly do not exist. In the embodiment, the cancel button 62, the authorization button 63, the guide message 64, the input value display space 65 and the position adjustment marks 66, which are shown in FIG. 5 and FIG. 6, are the objects which are arranged fixedly. The input keys 61 are arranged in a space in which the above objects do not exist.

Next, the CPU 11 confirms whether the multi-function peripheral 10 is connected with the portable terminal 40 so as to be communicable with each other (Step S102). In case that the multi-function peripheral 10 is connected with the portable terminal 40 so as to be communicable with each other (Step S103; Yes), the process proceeds to Step S108. In case that the multi-function peripheral 10 is not connected with the portable terminal 40 so as to be communicable with each other (Step S103; No), the CPU 11 instructs the operation panel 30 to display the warning message on the display unit 31 and prompts the user to prepare the portable terminal 40 so as to be communicable with the multi-function peripheral 10 (Step S104).

Then, the CPU 11 confirms whether the multi-function peripheral 10 is connected with the portable terminal 40 so as to be communicable with each other. In case that the multi-function peripheral 10 is connected with the portable terminal 40 so as to be communicable with each other within the predetermined time (Step S105; Yes), the process proceeds to Step S108. In case that the multi-function peripheral 10 is not connected with the portable terminal 40 so as to be communicable with each other even though the predetermined time elapses (Step S105; No), the CPU 11 instructs the display unit 31 of the operation panel 30 to display the normal operation window 60A (See FIG. 5) for displaying each of the input keys 61 for inputting the security information so as to enable the user to visually recognize the keys (Step S106). Then, the operation panel 30 receives the input operation of the security information via the normal operation window 60A (Step S107) and the process is ended.

In case that the multi-function peripheral 10 is connected with the portable terminal 40 so as to be communicable with each other (Step S103; Yes or Step S105; Yes), the CPU 11 instructs the display unit 31 of the operation panel 30 to display the secret operation window 60B (See FIG. 6) in which each of the input keys 61 for inputting the security information is hidden (Step S108). Then, the multi-function peripheral 10 transmits the arrangement information of the input keys 61 and the input value display space 65 which are hidden in the secret operation window 60B, to the portable terminal 40 (Step S109). For example, the arrangement information of the input keys 61 includes the position coordinate of each input key 61 in the coordinate system in which the bottom left of the display unit 31 of the operation panel 30 is set to the original point, the shape and the size of each input key 61, the contents (characters or marks) assigned to each input key 61 and the like.

Further, the multi-function peripheral 10 transmits the message for instructing the user to suitably carry out the dummy input except the input which is necessary for the security information, for the space in which the input keys 61 and the like are not arranged, and the display instruction for displaying the above message, to the portable terminal 40 (Step S110).

Then, the operation panel 30 monitors the operation for the secret operation window 60B in which the input keys 61 are hidden, from the user (Step S111). In case that the operation is received at the place at which the hidden input key 61 is defined (Step S112; Yes), the character or the mark assigned to the hidden input key 61 defined at the above place is input on the assumption that the hidden input key 61 is operated (Step S113).

Further, the CPU 11 transmits the input contents to the portable terminal 40 (Step S114), and the process returns to Step S111. The transmission of the input contents is carried out by coding the input contents. Instead of the transmission of the input contents themselves, the numbers or the like assigned to the input keys 61 may be transmitted. For example, in case that the information indicating the correspondence between the number assigned to each input key 61 and the contents of the input key 61 is transmitted to the portable terminal 40, the portable terminal 40 can recognize the input contents by transmitting the number assigned to each input key 61 to the portable terminal 40.

In case that the operation for finishing the input, such as the operation for the authorization button 63, is received (Step S115; Yes), the CPU 11 transmits the instruction for finishing the display of the display unit 41, to the portable terminal 40 (Step S116). The process is ended. In case that the operation for finishing the input is not received (Step S115; No), the process returns to the Step S111.

Figure 8:
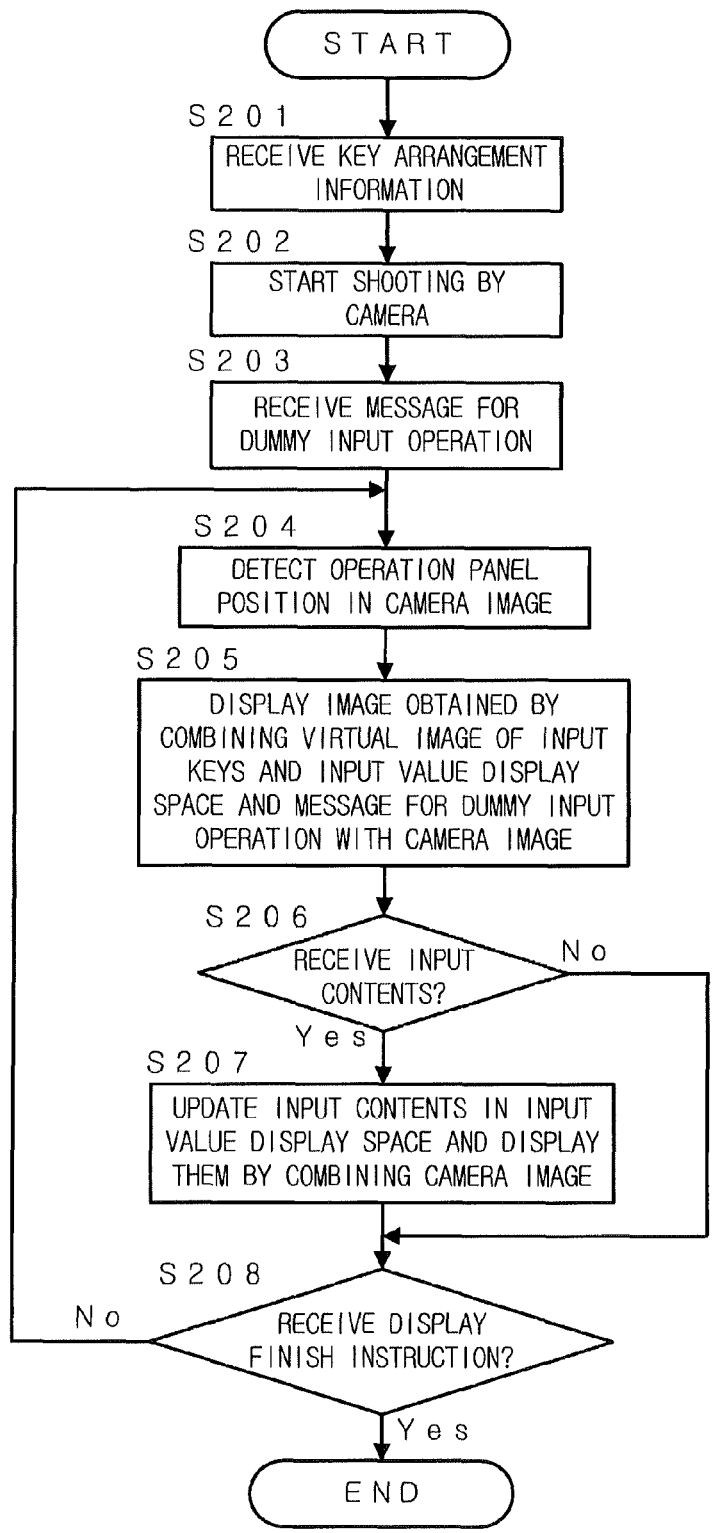
FIG. 8 is a flowchart showing the operation of the portable terminal, which is carried out when the security information is input via the operation panel of the multi-function peripheral by using the portable terminal.

FIG. 8 is the flowchart showing the operation of the portable terminal 40 which is used when the security information is input via the secret operation window 60B displayed on the operation panel 30. FIG. 8 shows the operation of the portable terminal 40, which corresponds to the operation shown in FIG. 7. When the portable terminal 40 receives the arrangement information of the input keys 61 and the input value display space 65, from the multi-function peripheral 10 (Step S201), the camera 42 starts the shooting (Step S202). Further, the portable terminal 40 receives the message for the dummy input and the instruction for displaying the above message, from the multi-function peripheral 10 (Step S203).

Then, the CPU 43 analyzes the camera image output from the camera 42 which carries out the continuous shooting and detects the position of the display unit 31 of the operation panel 30 in the camera image. In this embodiment, the CPU 43 detects the position adjustment marks 66 and detects the display unit 31 in the camera image in accordance the position adjustment marks 66 (Step S204). In detail, the CPU 43 detects the position, the size, the inclination and the like of the display unit 31 in the camera image on the basis of the position of each of the position adjustment marks 66 which are arranged at the four corners of the secret operation window 60B or the diagonal positions among the four corners and the distance between the operation panel 30 and the portable terminal 40.

Next, the CPU 43 combines the virtual image of each input key 61 and the virtual image of the input value display space 65 with the camera image by matching the position, the size, the inclination and the like of the display unit 31 of the operation panel 30, and instructs the display unit 41 of the portable terminal 40 to display the image obtained by further combining the message for the dummy input, which is received in Step S203, with the above combined image so as not to overlap the display unit 31 in the camera image (Step S205). In the combination of the virtual image, the CPU 43 recognizes the position and the shape of each input key 61 and those of the input value display space 65 in the display unit 31 of the actual operation panel 30 from the arrangement information received in Step S201, and combines the images by matching each size, position, inclination and the like of the virtual images of the input key 61 and the input value display space 65 with the position, the size, the inclination and the like of the display unit 31 of the operation panel 30 in the camera image, in accordance with the arrangement information and the information detected in Step S204.

Then, in case that the input contents input by operating the input keys 61 are received from the multi-function peripheral 10 (Step S206; Yes), the CPU 43 updates the input contents for the input value display space 65 in accordance with the input contents and displays the contents by combining them with the camera image (Step S207). For example, the display contents of the portable terminal 40 are ones shown in the lower part of FIG. 2.

In case that the operation for finishing the display is received from the multi-function peripheral 10 (Step S208; Yes), the process is ended. In case that the operation for finishing the display is not received (Step S208; No), the process returns to Step S204.

Because the multi-function peripheral 10 carries out the process shown in FIG. 7 and the portable terminal 40 carries out the process shown in FIG. 8, it is possible to input the security information via the operation panel 30 of the multi-function peripheral 10 in the display state shown in FIG. 2. That is, in case that the input of the security information, such as a password, is received, the input keys 61 used for inputting the security information are hidden in the operation panel 30 of the multi-function peripheral 10. On the other hand, in the display unit 41 of the portable terminal 40, the image obtained by combining the virtual image of the input keys 61 with the situation in which the operator operates the operation panel 30 with his/her finger, is displayed. Because the operator carries out the input operation for the operation panel 30 while the operator looks at the display of the portable terminal 40, it is possible to carry out the input operation for the operation panel 30 in which the input keys 61 are hidden, while the operator recognizes the position of each input key 61.

For example, in case that the user operates the input operation for inputting the security information via the operation panel 30 while the user looks at the portable terminal 40 by bringing the user's face close to the portable terminal 40 so as to prevent another user from secretly looking at the portable terminal 40, even though another person secretly looks at the operation panel 30 or the motion of the finger is monitored by using a video camera, it is possible to prevent the leak of the input contents.

Because the actual input operation is carried out for the operation panel 30, it is not required to transmit the input contents from the portable terminal 40 to the multi-function peripheral 10. As a result, the leak of the input contents, which is caused by the above transmission of the input contents, can be prevented.

Because each of the input keys 61 is fully hidden on the operation panel 30, it is possible to make it more difficult for another user who secretly looks at the operation panel 30 to guess the key arrangement by scattering the input keys 61 in the window of the operation panel 30 as shown in FIG. 2, as compared with the key arrangement in which the keys are arranged regularly, such as in a matrix form. As a result, it is possible to enhance the security.

Further, because each of the input keys 61 is fully hidden on the operation panel 30, another person cannot discriminate the operation for the input keys 61 from the operation for the space in which the keys are not arranged, from the situation in which the user operates the operation panel 30. In this embodiment, by displaying the message for instructing the user to suitably carry out the dummy input for the space in which the input keys are not arranged, on the portable terminal 40, the user is prompted to carry out the dummy input. For example, in case that the security information to be input is "02751", the user can operate the operation panel 30 by suitably mixing the dummy input (X) at the beginning and/or the end of the security information and/or in the middle of the security information, such as "X02X75X1X" (X indicates the dummy input which is carried out for the space.). Because the dummy input which is carried out for the space is automatically ignored by the operation panel 30, the dummy input can be carried out without adding the specific process.

As described above, by carrying out the dummy input, another person cannot recognize the number of the characters constituting the security information. Therefore, it is possible to improve the security.

Next, the second embodiment will be explained.

In the first embodiment, the input keys 61 are fully hidden on the secret operation window 60B. On the other hand, in the second embodiment, the secret operation window in which the frame of each input key 61 is displayed and the input contents of the input keys 61 (the character or the mark which is assigned to the input key 61) cannot be visually recognized, is displayed.

Figure 9:
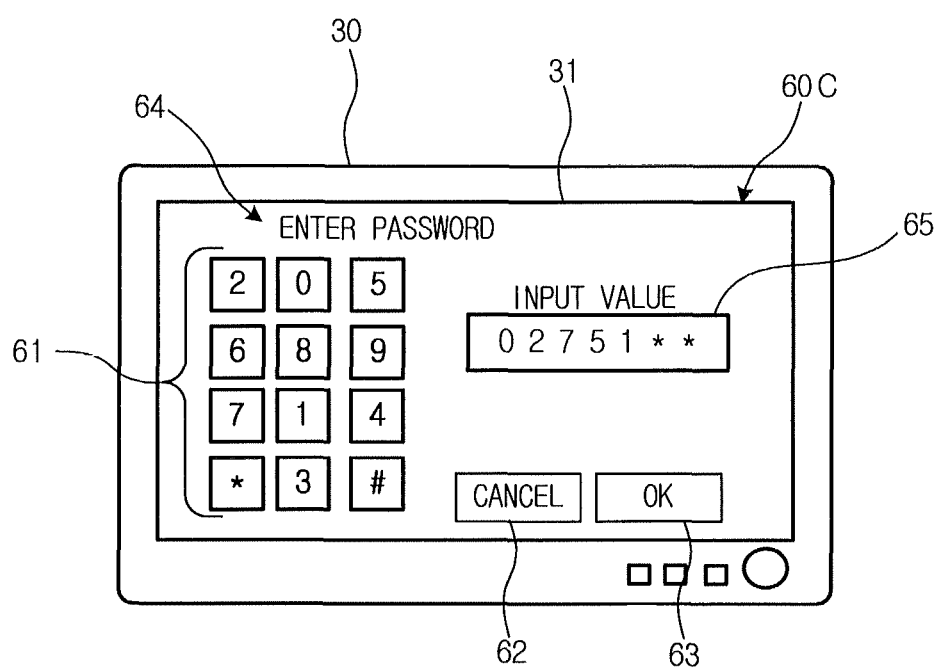
FIG. 9 is a plan view showing an example of the normal operation window which is displayed during the input of the security information according to the second embodiment.
Figure 10:
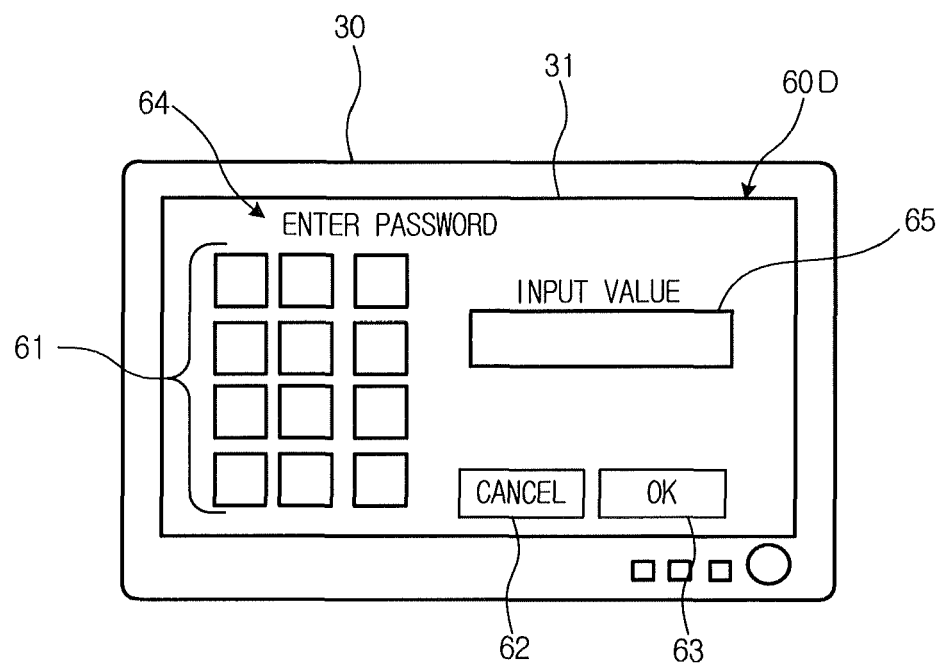
FIG. 10 is a plan view showing an example of the secret operation window (in which the contents of the input keys are hidden) which is displayed during the input of the security information according to the second embodiment.

FIG. 9 shows an example of the normal operation window 60C which is displayed during the input of the security information according to the second embodiment. FIG. 10 shows an example of the secret operation window 60D which is displayed during the input of the security information. The normal operation window 60C is displayed on the display unit 31 of the operation panel 30 when the security information is input via the operation panel 30 without using the portable terminal 40. In the normal operation window 60C, the objects, such as a plurality of input keys 61 used for inputting each character of the security information, a cancel button 62, an authorization button 63, a guide message 64, an input value display space 65 and the like, are displayed so as to enable the user to visually recognize all of them.

The secret operation window 60D is displayed on the display unit 31 of the operation panel 30 when the security information is input by using the portable terminal 40. In the secret operation window 60D, only the frame (shape) of each input key 61 displayed in the normal operation window 60C is displayed and the contents of the input keys 61 (the character or the mark which is assigned to the input key 61) are not displayed. Further, the frame of the input value display space 65 is displayed, but the input contents received by the input operation are not displayed.

In the secret operation window 60D, the position adjustment marks 66 which are displayed in the secret operation window 60B according to the first embodiment, are not displayed. In the second embodiment, the frame of each input key 61 and the frame of the input value display space 65 function as the position adjustment marks. Alternatively, the input value display space 65 may be fully hidden with the frame thereof.

In case that the frame of each input key 61 is displayed, another person who secretly looks at the operation panel 30 can recognize whether the operator operates the input keys 61 or another portion. Therefore, it is not significant that the input keys 61 are scattered as shown in the secret operation window 60B according to the first embodiment. In the second embodiment, in order to prioritize the operability, the input keys 61 are arranged in the matrix form. However, the contents assigned to each input key 61 are changed randomly every when the security information is input.

Further, in the second embodiment, because the frame of each input key 61 is displayed, the dummy input cannot be carried out for the space. Therefore, the dummy input is carried out the predetermined number of times at the designated input position in the security information, such as at the beginning and/or the end of the security information and/or in the middle of the security information.

Figure 11:
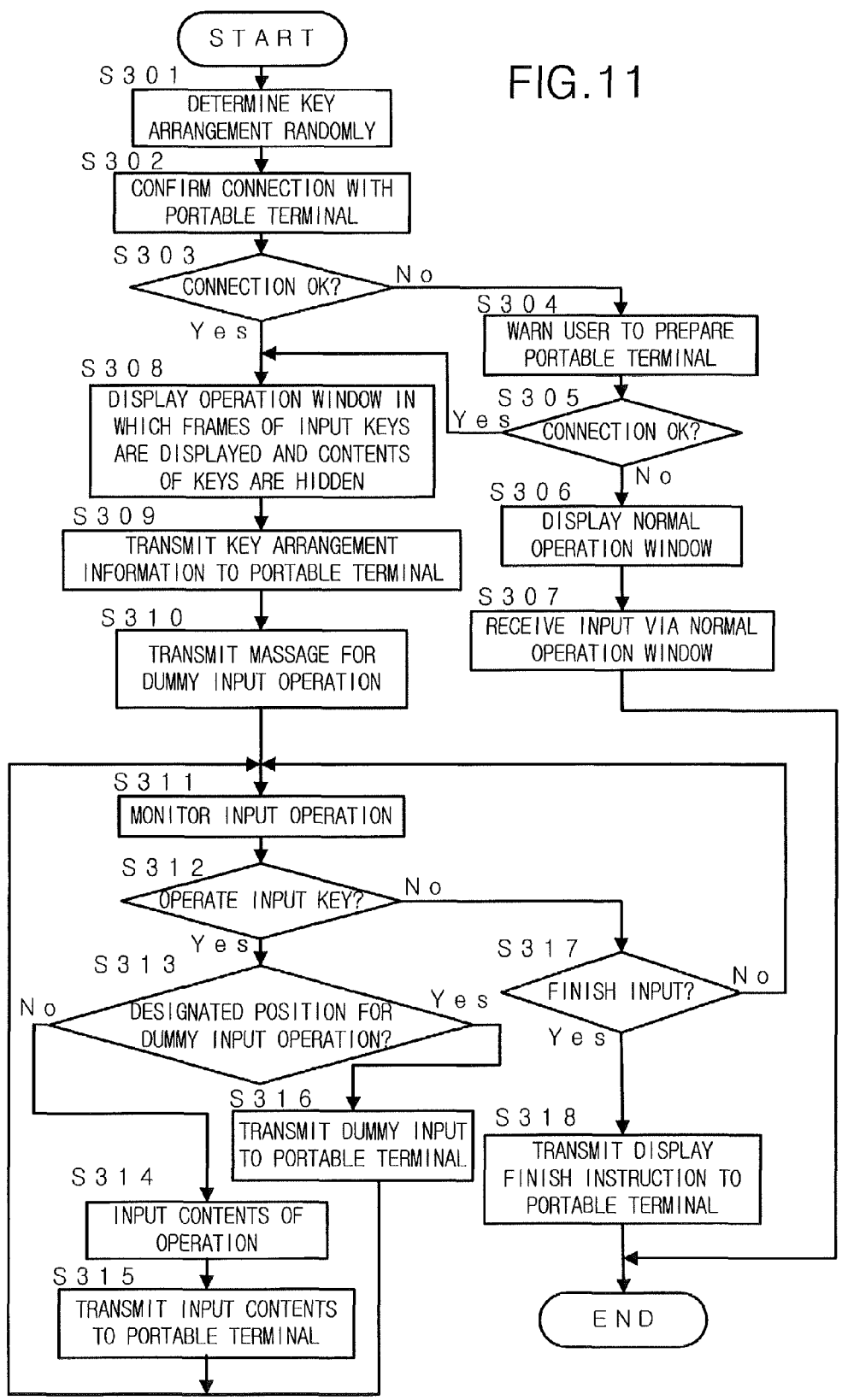
FIG. 11 is a flowchart showing the operation of the multi-function peripheral, which is carried out when the security information is input via the operation panel of the multi-function peripheral by using the portable terminal according to the second embodiment.

FIG. 11 is a flowchart showing the operation of the multi-function peripheral 10, which is carried out when the security information, such as a password, is input via the operation panel 30 of the multi-function peripheral 10 according to the second embodiment. The CPU 10 for controlling the operation panel 30 determines the key arrangement of each input key 61 for inputting the security information, for example by the random sampling or the like, when the input of the security information is received (Step S301). In the second embodiment, because the physical arrangement of the input keys 61 is fixed to the matrix form, the CPU 11 determines and sets the key arrangement by randomly changing the characters or the marks which are assigned to the input keys 61.

Next, the CPU 11 confirms whether the multi-function peripheral 10 is connected with the portable terminal 40 so as to be communicable with each other (Step S302). In case that the multi-function peripheral 10 is connected with the portable terminal 40 so as to be communicable with each other (Step S303; Yes), the process proceeds to Step S308. In case that the multi-function peripheral 10 is not connected with the portable terminal 40 so as to be communicable with each other (Step S303; No), the CPU 11 instructs the operation panel 30 to display the warning message on the display unit 31 and prompts the user to prepare the portable terminal 40 so as to be communicable with the multi-function peripheral 10 (Step S304). Then, the CPU 11 confirms whether the multi-function peripheral 10 is connected with the portable terminal 40 so as to be communicable with each other. In case that the multi-function peripheral 10 is connected with the portable terminal 40 so as to be communicable with each other within the predetermined time (Step S305; Yes), the process proceeds to Step S308.

In case that the multi-function peripheral 10 is not connected with the portable terminal 40 so as to be communicable with each other even though the predetermined time elapses (Step S305; No), the CPU 11 instructs the display unit 31 of the operation panel 30 to display the normal operation window 60C (See FIG. 9) in which the user can visually recognize the contents of the input keys 61 for inputting the security information (Step S306). Then, the operation panel 30 receives the input operation of the security information via the normal operation window 60C (Step S307) and the process is ended.

In case that the multi-function peripheral 10 is connected with the portable terminal 40 so as to be communicable with each other (Step S303; Yes or Step S305; Yes), the CPU 11 instructs the display unit 31 of the operation panel 30 to display the secret operation window 60D in which only the frame of each input key 61 for inputting the security information is displayed and the contents of the input keys 61 are hidden (Step S308). Then, the multi-function peripheral 10 transmits the arrangement information of the input keys 61 and the input value display space 65 to the portable terminal 40 (Step S309). Further, the multi-function peripheral 10 transmits the message for instructing the user to carry out the dummy input except the input which is necessary for the security information the predetermined number of times at the designated input position in the security information, such as at the beginning and/or the end of the security information and/or in the middle of the security information, and the display instruction for displaying the above message, to the portable terminal 40 (Step S310).

For example, the multi-function peripheral 10 transmits the message for instructing the user to carry out the dummy input twice after the input of the password is finished. In case that the designated position at which the dummy input is carried out and the number of times the dummy input is carried out, are changed every time the security information is input or are changed after the security information is input several times, the security is improved more.

Then, the operation panel 30 monitors the operation for the secret operation window 60D in which only the frame of each input key 61 is displayed but the contents thereof are hidden, from the user (Step S311). In case that the operation which is carried out for the area in which the frame of any one of the input keys 61 is displayed, is received (Step S312; Yes), the CPU 11 judges whether the received operation is carried out at the predetermined position at which the dummy input is carried out (Step S313). For example, in case that the CPU 11 instructs the user to carry out the two-digit dummy input at the end of the five-digit password, the CPU 11 judges that the sixth input and the seventh input are the dummy input.

In case that the received input operation is not the dummy input (Step S313; No), the CPU 11 recognizes that the character or the mark assigned to the operated input key 61 is input (Step S314). Further, the multi-function peripheral 10 transmits the input contents to the portable terminal 40 (Step S315), and the process returns to Step S311.

In case that the received input operation is the dummy input (Step S313;Yes), the multi-function peripheral 10 informs the portable terminal 40 that the dummy input is carried out (Step S316). Then, the process returns to Step S311.

In case that the operation for finishing the input, such as the operation for the authorization button 63, is received (Step S317; Yes), the CPU 11 transmits the instruction for finishing the display of the display unit 41, to the portable terminal 40 (Step S318). The process is ended. In case that the operation for finishing the input is not received (Step S317; No), the process returns to the Step S311.

The process which is carried out by the portable terminal 40 is substantially the same as that of FIG. 8. However, in the second embodiment, because the frame of each input key 61 is displayed on the actual operation panel 30, the frame of each input key 61 is also displayed on the operation panel in the camera image shot by the camera 42 of the portable terminal 40. In Step S205, the CPU 43 combines the character or the mark indicating the contents of each input key 61, with the frame of each input key 61 by matching the position of each character or the like with the position of the above frame. Of course, the CPU 43 may combine the virtual image of the whole input keys 61 including the frames, with the camera image. Further, the input value display space 65 is displayed on the display unit 41 of the portable terminal 40 like the input keys 61.

Figure 12:
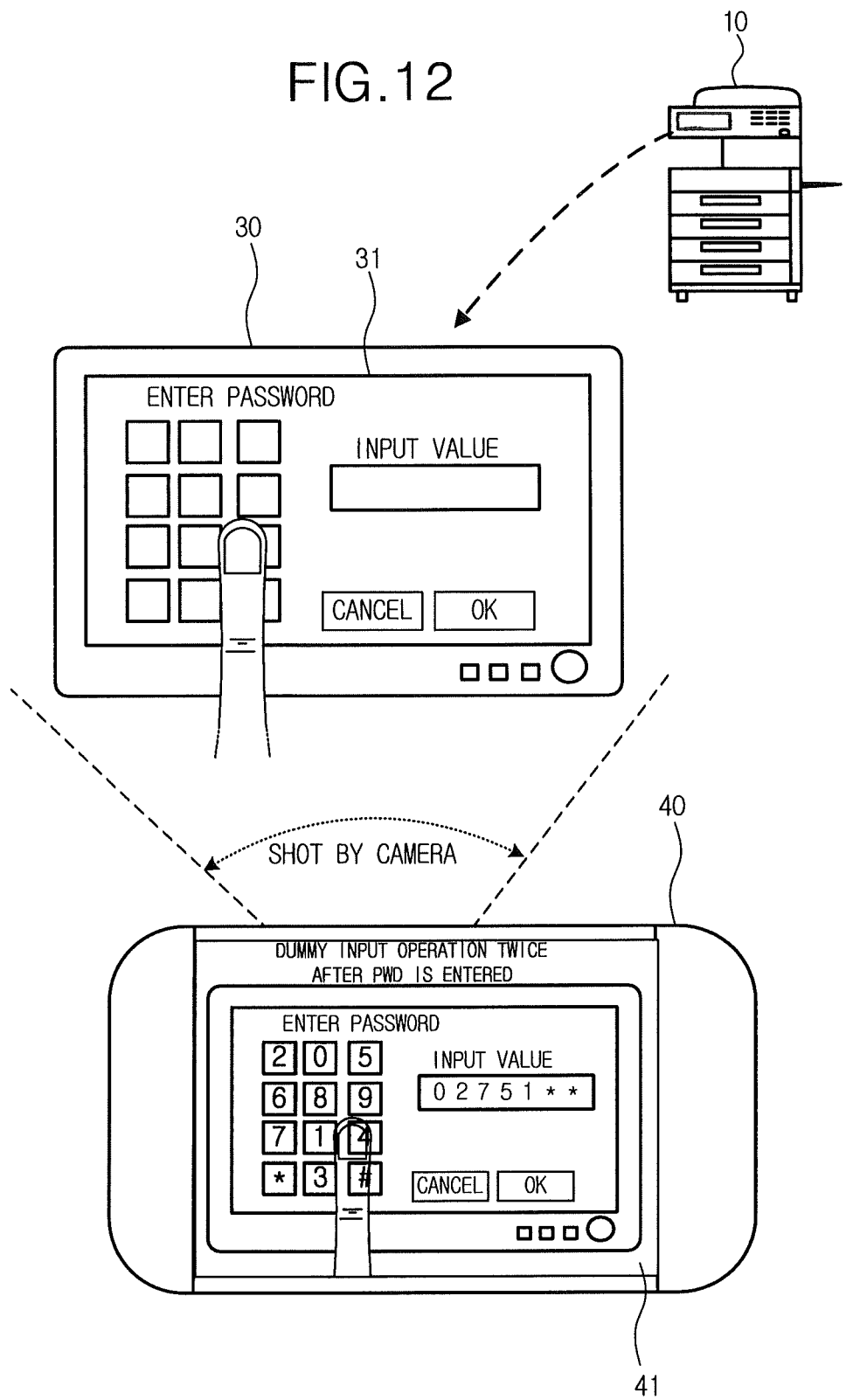
FIG. 12 is an explanatory view showing an example of the state in which the security information is input via the operation panel of the multi-function peripheral by using the portable terminal according to the second embodiment.

FIG. 12 shows an example of the state in which the security information is input via the operation panel 30 of the multi-function peripheral 10 by using the portable terminal 40 according to the second embodiment. In case that the input of the security information, such as a password, is received, in the secret operation window 60D displayed on the operation panel 30 of the multi-function peripheral 10, the frame of each input key 61 used for inputting the security information is displayed, but the contents of each input key 61 are hidden. In the display unit 41 of the portable terminal 40, the image obtained by combining the virtual image of the contents of each input key 61 with the situation in which the operator operates the operation panel 30 with his/her finger so as to match the position of the virtual image with the above situation, is displayed. Because the operator carries out the input operation for the operation panel 30 while the operator looks at the display of the portable terminal 40, it is possible to carry out the input operation for the operation panel 30 in which the contents of each input key 61 are hidden, while the operator recognizes the contents of each input key 61.

For example, in case that the user operates the input operation for inputting the security information via the operation panel 30 so as to prevent another user from secretly looking at the portable terminal 40, such as by bringing the user's face close to the portable terminal 40, even though another person secretly looks at the operation panel 30 or the motion of the finger is monitored by using a video camera, it is possible to prevent the leak of the input contents.

Further, because the dummy input is carried out during the input operation, another person cannot recognize the number of the characters constituting the security information. As a result, it is possible to enhance the security. In the example shown in FIG. 12, the message for instructing the user to carry out the dummy input twice after the password is input is displayed on the portable terminal 40. At this time, in case that the original password is "02751" and the user inputs the seven-digit password, such as "0275138", the operation panel 30 recognizes the last two-digit input as the dummy input. In the input value display space 65 of the portable terminal 40, "02751**" is displayed. By the input value display space 65, it is indicated that the last two-digit input is recognized as the dummy input.

Next, the third embodiment will be explained.

In the first and the second embodiments, the portable terminal 40 is used during the input operation for inputting the security information. In the third embodiment, a transmission type of head-mounted display 70 is used instead of the portable terminal 40.

Figure 13:
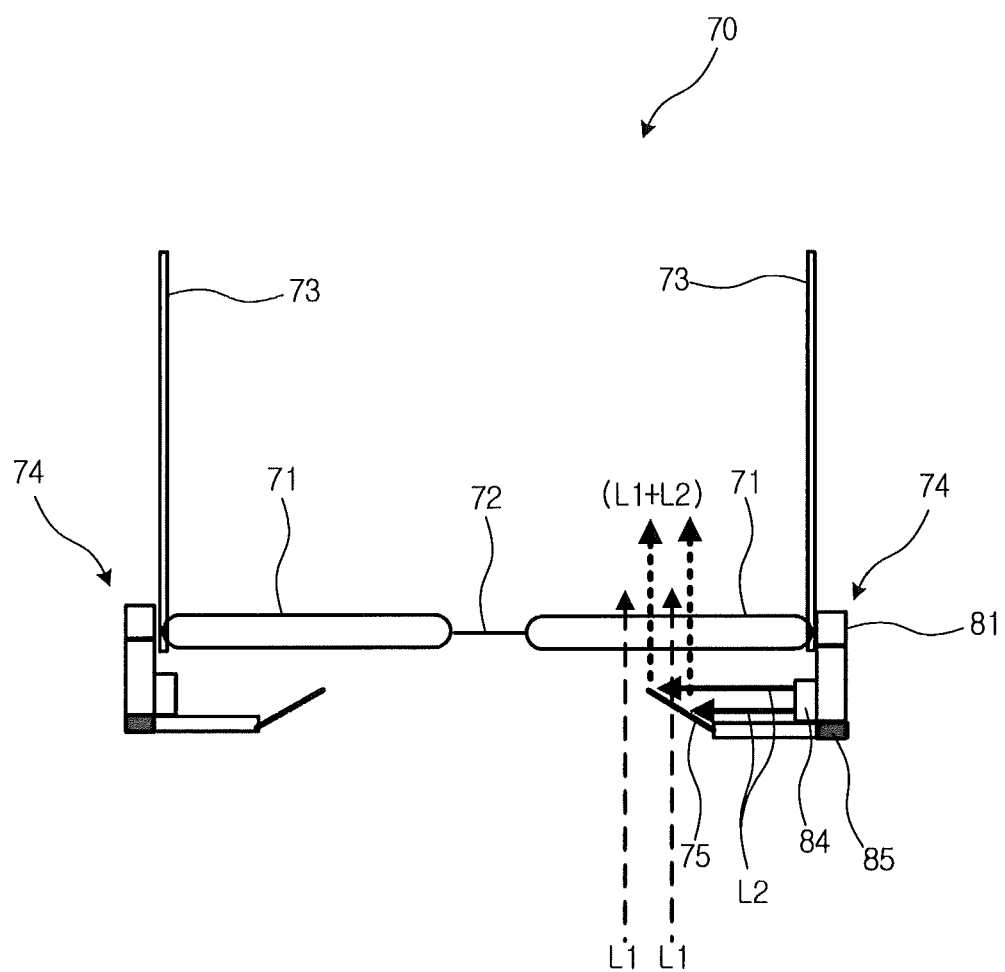
FIG. 13 is a view showing the schematic structure of the head-mounted display.

FIG. 13 shows the schematic configuration of the head-mounted display 70. The head-mounted display 70 has a form which is similar to that of an eye glasses, and is used by mounting it on a human's head. In the head-mounted display 70 of this embodiment, the system in which an image is overlapped with the outside scene by using half mirrors (so-called, the light transmission type), is adopted.

The head-mounted display 70 comprises display units 71 which are arranged in front of the user's right and left eyes, respectively when the user wears the head-mounted display 70, a bridge 72 for connecting between the right and left display units 71, temples 73 which extend in the same direction from each end portion of the right and left display units 71 connected by the bridge 72 and which are put on the user's ears, and the like.

On each end portion of the display units 71, a main unit 74 including a control circuit comprising a network communication unit 81, an image processing unit 82 and a control unit 83; a projecting unit 84; a camera 85 and the like, is provided. Further, a half mirror 75 is supported by a support member extending from each of the main units 74 so as to be arranged in front of each display unit 71.

The half mirror 75 is provided so as to slant at the angle of 45 degree with respect to the light L1 which is incident from the front of the head-mounted display 70 to the display unit 71. The projecting unit 84 of the main unit 74 projects the image (which is an image light L2 of the augmented reality information) to the half mirror 75. The half mirror 75 is formed by coating a reflective film (a metal film and a dielectric film) on a transparent substrate (glass substrate). In the half mirror 75, the ratio of the amount of the transmitted light to the amount of the reflected light is 1:1.

The light obtained by synthesizing the outside light L1 and the image light L2 at the ratio of 1:1 is incident to eyes of the user who wears the head-mounted display 70 via the display units 71. That is, the user who wears the head-mounted display 70 watches the situation which is obtained by overlapping the outside scene with the image projected by the projecting unit 84 at the transmittance of 50%.

Figure 14:
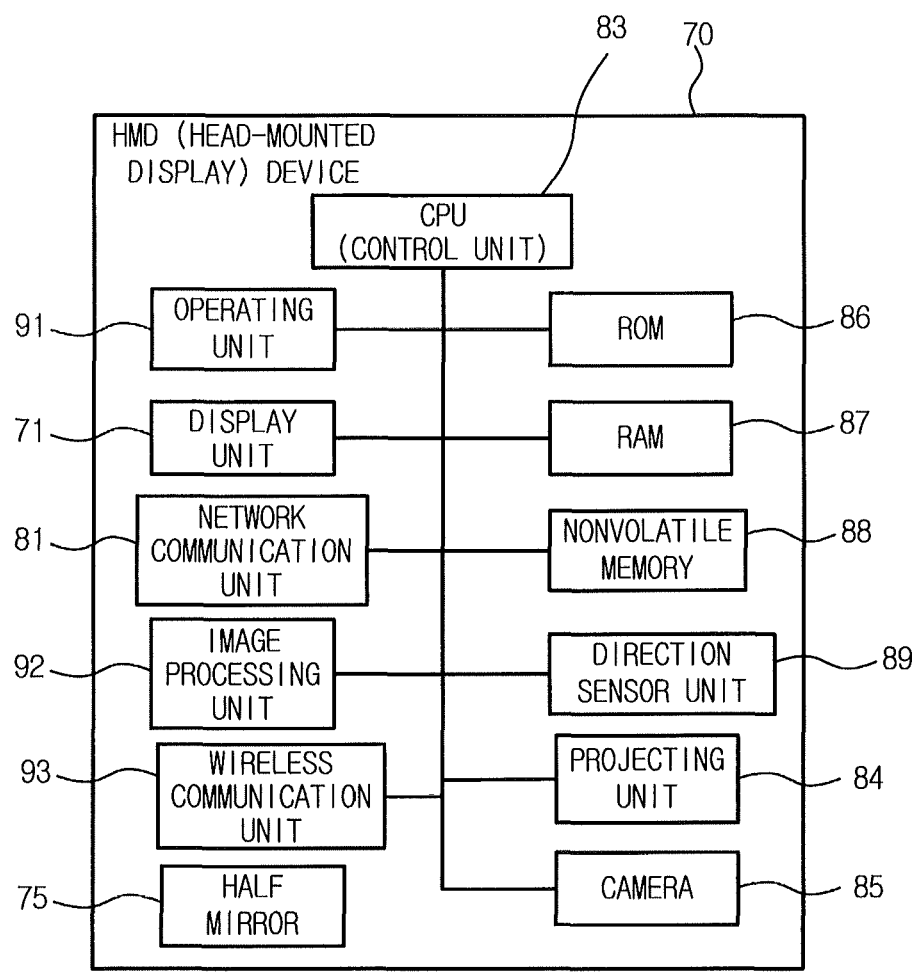
FIG. 14 is a block diagram showing the configuration of the head-mounted display.
Figure 16:
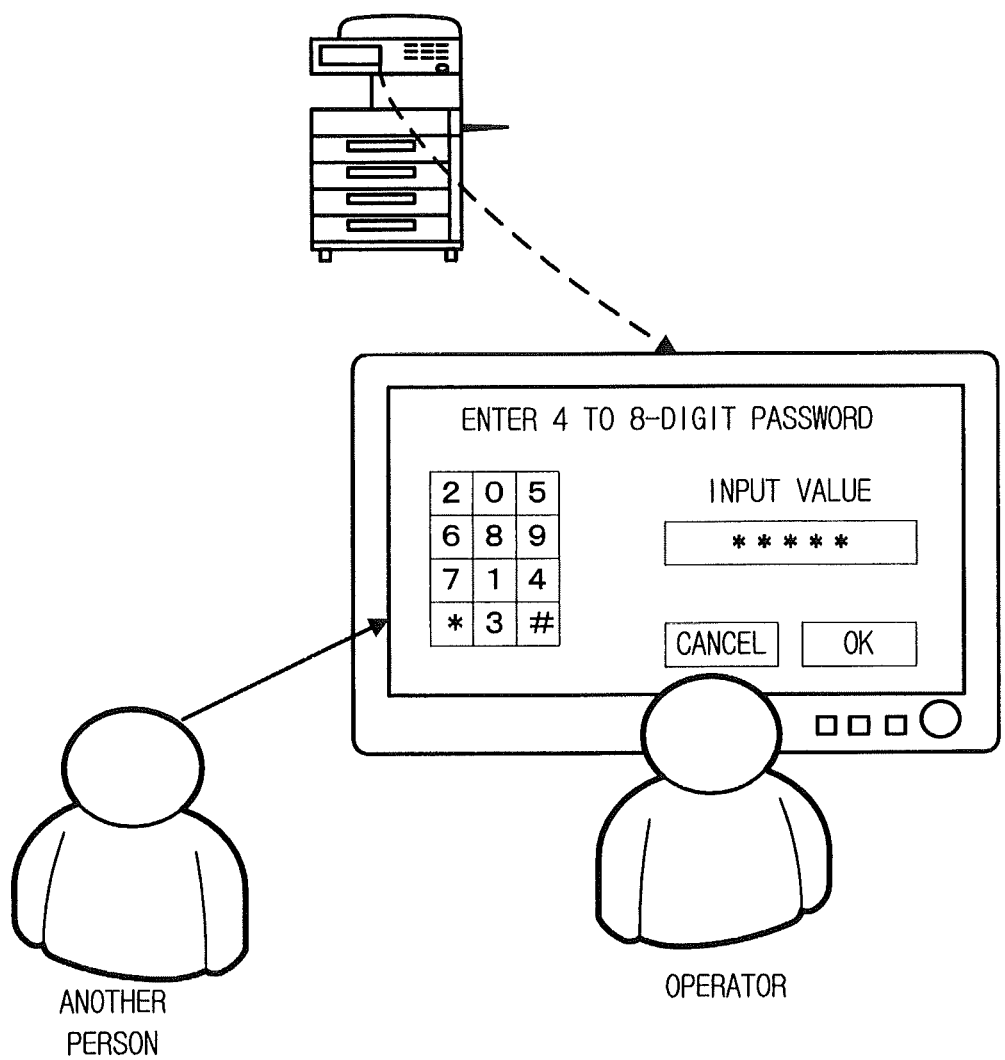
FIG. 16 is an explanatory view showing the situation in which another person secretly looks at the conventional operation panel.
Figure 17:
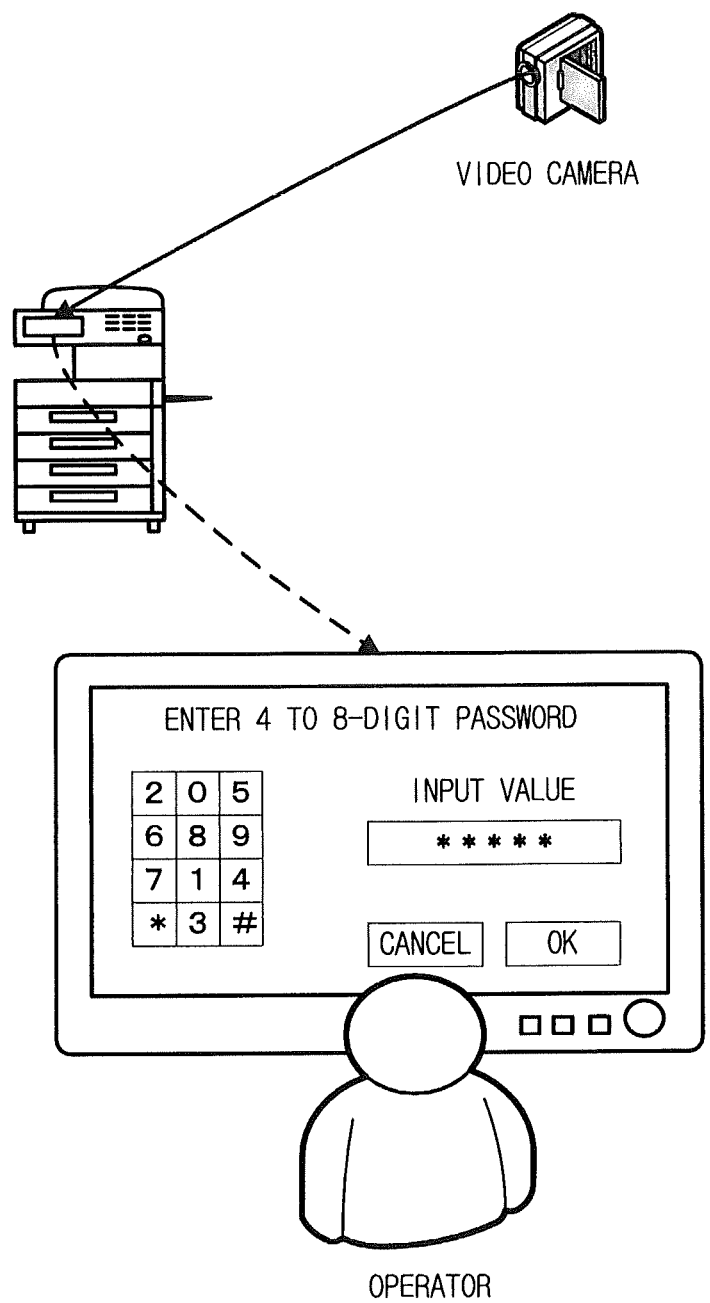
FIG. 17 is an explanatory view showing the situation in which another person secretly monitors the conventional operation panel by using the installed video camera.

FIG. 14 is a block diagram showing the configuration of the head-mounted display 70. The head-mounted display 70 comprises a CPU 83 which functions as a control unit, a ROM 86, a RAM 87, a nonvolatile memory 88, a direction sensor unit 89, the projecting unit 84, the camera 85, an operating unit 91, the display unit 71, the network communication unit 81, the image processing unit 92, a wireless communication unit 93 and the like, which are connected to the CPU 83 via a bus.

The CPU 83 controls the operation of the head-mounted display 70 in accordance with the programs stored in the ROM 86. In the ROM 86, the programs, the fixed data and the like are stored. The RAM 87 is used as a work memory for temporarily storing various data when the CPU 83 executes the process in accordance with the programs. In the nonvolatile memory 88, various types of setting information are stored.

The direction sensor unit 89 detects the direction and the attitude of the head-mounted display 70 and the change in the direction and the attitude. The camera 85 carries out the shooting in the front direction of the head-mounted display 70. In detail, the camera 85 carries out the shooting in the range which is substantially the same as the eyesight in the user's eyes. The camera 85 may be provided on each of the right and left main units 74, or on one of the right and left main units 74. The camera 85 takes the movie, for example, the camera 85 takes the images at 30 frames per second.

The operating unit 91 comprises a switch and the like which are provided in the main unit 74 and the like, and are used for adjusting the brightness of the projected image.

The network communication unit 81 has a function to communicate with the multi-function peripheral 10 or another external device via a network, such as LAN. The wireless communication unit 93 has a function to carry out the wireless communication with the nearby multi-function peripheral 10. The wireless LAN may be used for the communication with the multi-function peripheral 10. The image processing unit 92 carries out the processing for the virtual image.

The process carried out by the transmission type of head-mounted display 70 is substantially the same as that of FIG. 8. In the first and the second embodiments, the display unit 41 of the portable terminal 40 displays the image obtained by combining the virtual image of the input keys 61 and the like with the camera image so as to match the position of the virtual image. However, in the third embodiment, the projecting unit 84 of the head-mounted display 70 projects only the virtual image of the input keys 61 and the like so as to match the position of the virtual image with the position of the display unit 31 of the operation panel 30 which the user looks at in the reality space.

In detail, the CPU 83 analyzes the camera image shot by the camera 85 of the head-mounted display 70, and specifies the position of the display unit 31 of the operation panel 30 in the camera image. The position of the display unit 31 in the camera image corresponds to the position of the display unit 31 which the user who wears the head-mounted display 70 looks at in the reality space. Then, the projecting unit 84 projects the virtual image of the input keys 61 and the like so as to match the position, the shape and the direction of the virtual image with the position, the size and the direction of the display unit 31 which the user looks at in the reality space.

Like the first embodiment, in case that the secret operation window 60B in which the input keys 61 are fully hidden is displayed on the display unit 31 of the operation panel 30, the image to be projected by the projecting unit 84 is the virtual image of the input keys 61 and the input value display space 65. Like the second embodiment, in case that the secret operation window 60D in which the frame of each input key 61 is displayed but the contents of each input key 61 are hidden, is displayed on the display unit 31 of the operation panel 30, the image to be projected by the projecting unit 84 is the image of the characters and the marks indicating the contents of the input keys 61 and the input contents displayed in the input value display space 65.

FIGS. 15A to 15D show the situation in which the security information is input via the operation panel 30 of the multi-function peripheral 10 by using the head-mounted display 70 in the third embodiment. FIG. 15A shows the display of the operation panel 30 of the multi-function peripheral 10. In this example, the secret operation window 60B in which the input keys 61 are fully hidden, is displayed.

FIG. 15B shows the reality space which the user who wears the head-mounted display 70 looks at. FIG. 15C shows the image projected by the projecting unit 84 of the head-mounted display 70. The virtual image of the input keys 61 and the input value display space 65 is projected so as to match the position, the shape, the inclination and the like of the virtual image with the display unit 31 of the operation panel 30 in the reality space, which is shown in FIG. 15B. FIG. 15D shows the contents which the user who wears the head-mounted display 70 looks at. The above contents shown in FIG. 15D is obtained by combining the space shown in FIG. 15B with the image shown in FIG. 15C.

As described above, in case that the head-mounted display 70 is used, only the user who wears the head-mounted display 70 can looks at the input keys 61 (or the contents of each input key 61) and the contents of the input value display space 65, which are projected by the projecting unit 84. Because another user cannot look at the input keys 61 and the like at all, it is possible to enhance the security more.

Next, the applications which are applicable in each of the above embodiments will be explained.

(1) Reduction in the Load Caused by the Process

The portable terminal 40 and the head-mounted display 70 analyze the image shot by the camera 42 or 85, and specifies the position, the size, the inclination and the like of the display unit 31 of the operation panel 30 in the camera image. The load caused by the process for specifying the position and the like is reduced as follows.

The above process for specifying the position and the like is only carried out when the CPU 43 or 83 initially detects the position and the like of the display 31 and when the CPU 43 or 83 detects that the position of the portable terminal 40 or the head-mounted display 70 is changed over a certain degree.

(2) Communication Between the Portable Terminal 40 and the Head-Mounted Display 70

In the embodiments, the communication between the multi-function peripheral 10 and the portable terminal 40 or the head-mounted display 70 is carried out by the wireless communication. However, the above communication may be carried out by the body area network. That is, when the operator having the portable terminal 40 with the operator's hand or the operator who wears the head-mounted display 70 operates the screen of the display unit 31 of the operation panel 30 with the operator's finger, the multi-function peripheral 10 communicates with the portable terminal 40 or the head-mounted display 70 via a human body as the communication medium.

For example, the selection button for determining whether the security information is input in the secret mode in which the portable terminal 40 or the head-mounted display 70 is used, is displayed on the display unit 31 of the operation panel 30. Then, when the user pushes the selection button for selecting the secret mode, the body area network is used. By the body area network, the connection with the portable terminal 40 or the head-mounted display 40 is confirmed. When the above connection is confirmed, the multi-function peripheral 10 transmits the arrangement information of the input keys 61 and the like to the portable terminal 40 or the head-mounted display 70.

Thereby, before the input operation for inputting the security information is actually carried out, it is possible to prepare the image obtained by combining the camera image with the arrangement information of the input keys 61 and the like, which is transmitted to the portable terminal 40 or the head-mounted display 70. By using the body area network, it is possible to enhance the security during the communication and to prevent the leak of the information due to the communication.

(3) Automatic Cancel of the Power Saving Mode in the Portable Terminal 40 or the Head-Mounted Display 70

In case that the portable terminal 40 or the head-mounted display 70 is in the power saving mode when it can be confirmed that the portable terminal 40 or the head-mounted display 70 is connected with the multi-function peripheral 10 so as to be communicable with each other at the timing of the input of the security information, the mode of the portable terminal 40 or the head-mounted display 70 is changed from the power saving mode to the normal mode. That is, by transmitting the predetermined mode changing command from the multi-function peripheral 10 to the portable terminal 40 or the head-mounted display 70, the status of the portable terminal 40 or the head-mounted display 70 is changed to the normal operation status.

As described above, the embodiments are explained by using the drawings. However, in the present invention, the concrete configuration is not limited to the above embodiments. In the present invention, various modifications of the above embodiments or the addition of various functions or the like to the embodiments can be carried out without departing from the gist of the invention.

In the embodiments, the case in which the above operation input system is applied to the multi-function peripheral 10 is explained. However, the equipment to which the above operation input system is applied is not limited to the multi-function peripheral 10. The effect of enhancing the security in the embodiments is exerted in case that another person cannot be fully prevented from secretly looking at the operation panel. For example, in case that the operation panel 30 is provided in the apparatus to be operated by the operation panel 30 in a unified manner, and cannot be removed from the main body of the apparatus, the above embodiments are preferable.

In the third embodiment, the head-mounted display in which the image is overlapped with the outside scene by using the half mirrors, is used. However, a VR (Virtual Reality) type of head-mounted display may be used. In the VR type of head-mounted display, when the user wears the head-mounted display, the user cannot look at the outside scene and can look at only the projected image. In this case, like the portable terminal 40, the image obtained by combining the virtual image of the input keys 61 and the like with the camera image may be displayed.

In case that in the secret operation windows 60B and 60D, the message "Enter password" or the like is not displayed and the above message is displayed only in the portable terminal 40, another person cannot recognize that the user inputs security information. Therefore, it is possible to enhance the security.

In the embodiments, the arrangement information of the input keys 61 and the like is transmitted from the multi-function peripheral 10 to the portable terminal 40 or the head-mounted display 70 and the virtual image of the input keys 61 and the like is prepared in accordance with the transmitted arrangement information and is combined by the portable terminal 40 or the head-mounted display 70. Each function of the multi-function peripheral 10, the portable terminal 40 and the head-mounted display 70 is not limited to the embodiments. For example, the portable terminal 40 or the head-mounted display 70 obtains the information relating to the position, the shape, the inclination and the like of the display unit 31 of the operation panel 30 by analyzing the camera image and transmits the obtained information to the multi-function peripheral 10. Then, the multi-function peripheral 10 prepares the image to be combined with the camera image, in accordance with the transmitted information, and transmits the prepared image to the portable terminal 40 or the head-mounted display 70. The portable terminal 40 displays the image obtained by combining the transmitted image with the camera image. Alternatively, the head-mounted display 70 projects the transmitted image by the projecting unit 84.

In the embodiments, the input value display space 65 and the input contents are displayed in the portable terminal 40 or the head-mounted display 70. The display of the input value display space 65 and the like may be omitted. Because the transmission of the input contents between the multi-function peripheral 10 and the portable terminal 40 or the head-mounted display 70 is not required, it is possible to enhance the security more.

The security information is not limited to the password which is exemplified in the embodiments. The security information can be optionally set or defined.

One of the objects of the above embodiments is to provide an operation input system and an operation input method in which even though another person looks at the operation window during the input of the security information, the input contents are not leaked.

In at least one of the above embodiments, in case that the operation display device receives the input of the security information, the operation display device displays the operation window in which the input keys themselves or the contents of the input keys (for example, the characters or the marks assigned to the input keys) cannot be visually recognized, on the display unit and the operation detecting unit receives the operation for the input keys which cannot be visually recognized. On the other hand, the display device controls the display contents of the second display unit so as to display the state in which a virtual image of the input keys is combined with a situation in which an operator operates the display unit so as to match the position of the virtual image with the predetermined position. Thereby, the operator can carry out the input operation for the operation window of the operation display device while the operator confirms the state in which the virtual image of the input keys is combined with the situation in which the operator operates the operation window in which the input keys cannot be visually recognized, by using the second display unit. Because the input keys (or the contents of the input keys) are hidden in the operation window of the operation display device, even though another person secretly looks at the operation window or the motion of the operation for the operation window, the input contents are not leaked.

In at least one of the above embodiments, even though the number of times the input operation is carried out for the operation display device is leaked by secretly looking at the operation window, another person who secretly looking at the operation window cannot discriminate the input operation which is necessary for inputting the security information from the dummy input operation by carrying out the dummy input operation except the above input operation. Therefore, it is possible to prevent the leak of the number of times the input operation which is necessary for inputting the security operation is carried out (for example, the number of digits of the password).

In at least one of the above embodiments, in case that the input keys are hidden, when the operator operates the operation window, another person who secretly looks at the operation window cannot discriminate the operation for the input keys from the dummy input operation for the space in which the input keys are not arranged. On the other hand, because the operator who looks at the second display unit can recognize the arrangement of each input key, the operator can recognize the position of the space in which the input keys are not arranged. Therefore, by instructing the operator to carry out the dummy input operation for the space in which the input keys are not arranged, it is possible to instruct the operator to carry out the dummy input operation while the excess input operation for the actual input keys is avoided.

In at least one of the above embodiments, because the contents of the input keys are hidden but the frame of each input key is displayed, the dummy input operation is carried out for any one of the input keys. Therefore, the operation display device instructs the operator to carry out the dummy input operation the predetermined number of times at the beginning or the end of the input operation which is necessary for inputting the security information or in the middle of the input operation. Thereby, in the operation display device, it is possible to ignore the input operation which is carried out the predetermined number of times at the designated input position in the security information, as the dummy operation input. Further, although another person who secretly looks at the operation window can recognize the number of times the operator carries out the operation for the input keys, another person cannot recognize the number of times the operator carries out the input operation which is necessary for inputting the security information.

In at least one of the above embodiments, it is possible to communicate between the operation display device and the display device by transmitting the information relating to the key arrangement from the operation display device to the display device. Therefore, it is possible to minimize the amount of information communicated between the operation display device and the display device.

In at least one of the above embodiments, in case that the operation display device cannot communicate with the display device, the input keys are displayed in the operation window of the operation display device so as to enable the operator to input the security information by using only the operation display device.

According to the operation input system and the operation input method, even though another person looks at the operation window during the input of the security information, because the input contents are not leaked, it is possible to enhance the security.

What is claimed is:

1. An operation input system, comprising:
   a first display device comprising
      a first display unit to display an operation input window,
      an operation detecting unit to detect an input at the operation input window, and
      a first controller that causes the first display unit to display the operation input window with input keys in a predetermined key arrangement, wherein at least some of the contents of the input keys are hidden from view; and
   a second display device that is communicable with the first display device, comprising
      a camera,
      a second display unit, and
      a second controller that causes the second display unit to display a virtual image of the input keys in accordance with an image of the operation input window obtained by the camera, so as to match a position of the virtual image with the operation input window,
   wherein in a case that the first display device receives the input of security information, the second controller causes the second display unit to display an instruction for carrying out a dummy input operation different from an operation which is necessary for inputting the security information.

2. The operation input system of claim 1, wherein in the case that the first display device receives the input of the security information, the first controller causes the first display unit to display the operation input window in which the input keys are hidden on the display unit, and instructs the operator to carry out the dummy input operation for an area in which the input keys are not arranged.

3. The operation input system of claim 1, wherein in the case that the first display device receives the input of the security information, the first controller causes the first display unit to display the operation input window in which each frame of the input keys is displayed and the contents of the input keys are hidden on the display unit, and instructs the operator to carry out the dummy input operation a predetermined number of times at a beginning or an end of the operation which is necessary for inputting the security information or in a middle of the operation which is necessary for inputting the security information.

4. The operation input system of claim 1, wherein in a case that the first display device receives the input of security information, the first display device transmits information relating to the predetermined key arrangement to the second display device, and
   the second controller causes the second display unit to display the virtual image of the input keys in accordance with the information relating to the predetermined key arrangement, which is received from the first display device.

5. The operation input system of claim 1, wherein in a case that the operation display device receives the input of security information, when the first display device cannot communicate with the second display device, the first controller causes the first display unit to display the input keys.

6. The operation input system of claim 1, wherein every time the first display device receives the input of security information, the first display device changes the key arrangement.

7. The operation input system of claim 1, wherein the second controller causes the second display unit to display an image obtained by combining the virtual image of the input keys with the image obtained by the camera.

8. The operation input system of claim 1, wherein the second display unit is a head-mounted display in which an image is overlapped with an outside scene by a half mirror, and the head-mounted display overlaps the virtual image of the input keys with the outside scene.

9. The operation input system of claim 1, wherein the first controller resets the key arrangement of the input keys at a predetermined timing in the operation input window so as to arrange the plurality of input keys randomly after the key arrangement is reset, and
   wherein each of the input keys includes a frame and the contents assigned to the input key in the frame.

10. The operation input system of claim 9, wherein the first controller changes the contents assigned to the input key in the frame at the predetermined timing.

11. An operation input method for carrying out an operation via an operation display device in a case where the operation display device receives input of security information, the operation input method comprising:
    displaying, on a first display unit, an operation input window with input keys in a predetermined key arrangement, wherein at least some of the contents of the input keys are hidden from view;
    displaying, on a second display unit, a virtual image of the input keys in accordance with an image of the operation input window obtained by a camera, so as to match a position of the virtual image with the operation input window; and
    receiving an input for the operation at the operation input window displayed on the first display unit, based upon the virtual image of the input keys displayed on the second display unit,
    wherein in a case where the operation display device receives the input of security information, further including a step of displaying, on the second display unit, an instruction for carrying out a dummy input operation, different from an operation which is necessary for inputting the security information.

12. The operation input method of claim 11, wherein in the case where the operation display device receives the input of security information, the operation input window in which the input keys are hidden is displayed on the first display unit, and the operator is instructed by the operation display device to carry out the dummy input operation for an area in which the input keys are not arranged.

13. The operation input method of claim 11, wherein in the case where the operation display device receives the input of security information, the operation input window is displayed in which each frame of the input keys is displayed and the contents of the input keys are hidden, and the operator is instructed by the operation display device to carry out the dummy input operation a predetermined number of times at a beginning or an end of the operation which is necessary for inputting the security information or in a middle of the operation which is necessary for inputting the security information.

14. The operation input method of claim 11, wherein in the case where the operation display device receives the input of the security information, information relating to the predetermined key arrangement is transmitted to the second display unit by the operation display device, and the virtual image of the input keys is displayed by the second display unit in accordance with the information relating to the predetermined key arrangement, which is received from the operation display device.

15. The operation input method of claim 11, wherein in the case where the operation display device receives the input of security information, when the operation display device cannot communicate with the second display unit, the input keys are displayed on the first display unit.

16. The operation input method of claim 11, wherein every time the operation display device receives the input of security information, the key arrangement is changed by the operation display device.

17. The operation input method of claim 11, wherein the second display unit displays an image obtained by combining the virtual image of the input keys with the image obtained by the camera.

18. The operation input method of claim 11, wherein the second display unit is a head-mounted display in which an image is overlapped with an outside scene by a half mirror, and the virtual image of the input keys is overlapped with the outside scene by the head-mounted display.

19. The operation input method of claim 11, wherein the key arrangement of the input keys is reset at a predetermined timing in the operation input window so as to arrange the plurality of input keys randomly after the key arrangement is reset, and wherein each of the input keys includes a frame and the contents assigned to the input key in the frame.

20. The operation input method of claim 19, wherein the contents assigned to the input key in the frame are changed at the predetermined timing.

* * * * *